United States Patent [19]
Jensen et al.

[11] Patent Number: 5,428,476
[45] Date of Patent: Jun. 27, 1995

[54] WIDE ANGLE REAR PROJECTION LENTICULAR LENS SYSTEM

[75] Inventors: Holger Jensen, Hvidovre, Denmark; Steve M. Scott, Cincinnati, Ohio

[73] Assignee: Stewart Filmscreen Corporation, Torrance, Calif.

[21] Appl. No.: 224,336

[22] Filed: Apr. 7, 1994

[51] Int. Cl.⁶ .............................................. G03B 21/60
[52] U.S. Cl. ....................................... 359/457; 359/460
[58] Field of Search ............... 359/453, 454, 455, 456, 359/460, 457

[56] References Cited

U.S. PATENT DOCUMENTS 3,218,924 11/1965 Miller .................................. 350/128
4,418,986 12/1983 Yata et al. .......................... 350/128

Primary Examiner—Richard A. Wintercorn
Attorney, Agent, or Firm—Koda and Androlia

[57] ABSTRACT

A wide angle lenticular lens system for a single piece rear projection screen including a plurality of substantially identical parallel and vertical lenticular lenses. Each of the plurality of lenticular lenses is substantially a single element lens and the shape of each of the plurality of lenticular lenses is substantially defined by a hyperbolic function.

10 Claims, 3 Drawing Sheets

WIDE ANGLE REAR PROJECTION LENTICULAR LENS SYSTEM

BACKGROUND OF THE INVENTION

1. Field of the Invention

The present invention relates to optical projection screens illuminated from the rear.

2. Prior Art

From the earliest days of optical projection, the optical images have also been projected from the rear through a projection screen. The, projection screen started out as being the most simplest, which was merely a thin sheet of cotton cloth. Such rear projection screens have been improved and examples of such screens are contained in the U.S. Pat. Nos. as follows:

3,257,900
3,578,841
4,418,986
4,509,822
4,548,469
4,561,720

While each of the above patents describes a rear projection screen which includes some sort of a lens system to increase the brightness, all of the above rear projection screens contain certain disadvantages. In particular, they are complex and expensive to manufacture since they include multi-element lenses, require multiple cutting tools and require precise registration between the various multiple cutting tools. Still further, the image itself produced through such screens also has certain defects. In particular, the horizontal viewing half angle is narrow, in the range of 15° to 35°, the color correction is poor and the light through the screen is not evenly distributed and contains hot spots.

SUMMARY OF THE INVENTION

It is a general object of the present invention to provide a rear projection screen which overcomes the disadvantages of the prior art.

In particular, it is a specific object of the present invention to provide a rear projection screen which is simple and inexpensive to manufacture.

In addition, it is another object of the present invention to provide a rear projection screen which has a wide horizontal viewing half angle which is greater than 35°, color corrects the image transmitted therethrough and provides even light distribution without significant hot spots.

In keeping with the principles of the present invention, the objects are accomplished by a wide angle lenticular lens system for a single piece rear projection screen comprising a plurality of identical vertical and parallel lenticular lenses. Each of the plurality of lenticular lenses is a single element lens whose shape is defined by a hyperbolic function:

$$(X^n/A^n)-(Y^n/B^n)=1$$

wherein a ratio of B to A is chosen to optimize an asymptote angle of a side of each of said plurality of lenticular lens with respect to incoming light into the lenticular lens so that most of the light impinging on the lenticular lens is internally reflected out through an end portion of the lenticular lens and n is chosen to optimize a curvature of said end portion of each of said lenticular lens based upon an index of a fraction of a material from which the lenticular lens is made so that light internally reflected from the sides of said lenticular lens impinges on the curvature of the end portion at an angle less than a critical angle. With the above described construction, substantially all the light entering each of the plurality of the lenticular lenses exits through the end portion and a wide horizontal viewing angle is provided.

BRIEF DESCRIPTION OF THE DRAWINGS

The above-mentioned features and objects will become more apparent with reference to the following description taken in conjunction with the following drawings wherein like reference numerals to known like elements and in which.

DETAILED DESCRIPTION OF THE INVENTION

Figure 1:
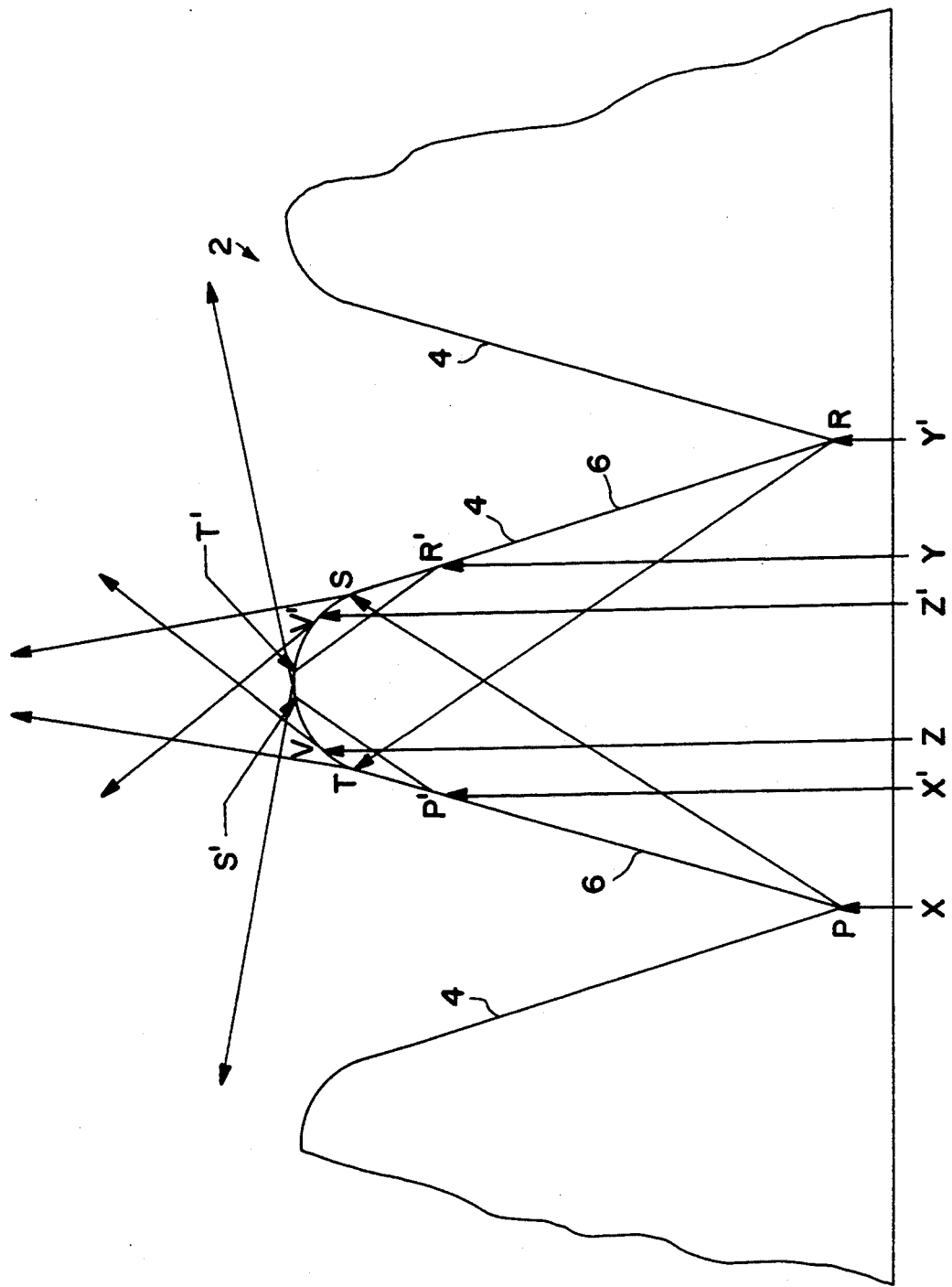
FIG. 1 is a partial section of a rear projection screen according to the teachings of the present invention illustrating the principles for the paths of the optical beams through the screen.

Referring to the FIG. 1, shown therein is a partial horizontal cross-section of the wide angle rear projection lenticular lens system 2 of the present invention. The lenticular lens system 2 of the present invention is made up of a plurality of parallel and identical vertical lenticular lenses 4. Each of the plurality of lenticular lenses 4 comprises a single element lens. Still further, the shape of the lenticular lens 4 from the point P to the point R is approximated by a hyperbolic function of the form:

$$(X^n/A^n)-(Y^n/B^n)=1$$

In the above function, the ratio of B to A is chosen to optimize the asymptote angle of the sides 6 of the lenticular lens 4 with respect to the incoming light into the lens. In particular, the ratio B to A is selected so that substantially all of the light impinging on the lenticular lens is internally reflected out through the curved end portion between the points T and S of the lenticular lens 4. In addition, n is chosen to optimize the curvature of the end portion of the lenticular lens based upon the index of refraction of the material from which the lenticular lens system 2 is made. In particular, the coefficient n is chosen such that the light internally reflected from the sides 6 of each of the lenticular lens 4 impinges on the curvature of the end portion at an angle less than a critical angle. The critical angle is the angle for any particular index of refraction for internal reflection wherein any light which has been reflected off of the sides 6 and attempts to exit through the end portion at any angle greater than the critical angle will not refract through the end portion of the lenticular lens 4 but will be reflected back into the material. As can be seen from FIG. 1, the light beams X, X' and Y, Y', which enter the lenticular lens 4 are reflected to the end portion of the lenticular lens 4 and are refracted together with light beams Z, Z' as they exit the end portion and not reflected.

The lenticular lens system 2 is made from a substantially transparent material, preferably a transparent resin suitable for optical uses, which has an index of refraction which is greater than 1. Suitable materials which would be included in such resins are acrylates and acrylics, particularly polymerized methyl-methacrylate which has an index of refraction of 1.491 and which would have a ratio of B to A of approximately 2.5. Utilizing such a material, the critical angle would be 42°.

The above described lenticular lens system 2 is made utilizing an automatic machine tool and in particular utilizes a single tool such as a diamond tool. Accordingly, because the shape of each lenticular lens 4 is a single element lens of relatively simple shape, the lenticular lens system 2 can be easily and inexpensively manufactured in this manner.

However, since the material is machined utilizing a diamond tool, the surface of the lenticular lens system 2 immediately after being cut is smooth and highly reflective. Accordingly and to improve the light distribution, the microstructure of the surface of the lenticular lens system is altered by means of a chemical etch. The etching of the surface provides specular diffusion of the impinging light for more even distribution in the horizontal viewing plane. Still further, the chemical etch also varies the microstructure of the surface which distorts the theoretical light distribution and thus tends to integrate the theoretical light distribution so that distinct high intensity variations due to the theoretical light distribution are less noticeable in the viewing field. The chemical etching of the surface also serves to diffuse the reflected ambient light from the surface of the viewing area to reduce glare of the screen and thereby decreases the "glossiness" of the rear projection screen and preserves the image contrast in high ambient lighting conditions.

Still further, to enhance the diffusion of the incoming light before it enters the actual lenticular lens 4, colorant and/or diffusing particles are added to the material from which the lenticular lens system 2 is manufactured. As a result of the diffusion caused by the colorant and/or diffusing particles, the light entering into the lenticular lens 4 itself is no longer completely collimated and increases the optical performance of the rear projection screen in a manner similar to the integrating effect caused by the chemical etching of the surface of the lenticular lens system 2.

Figure 2:
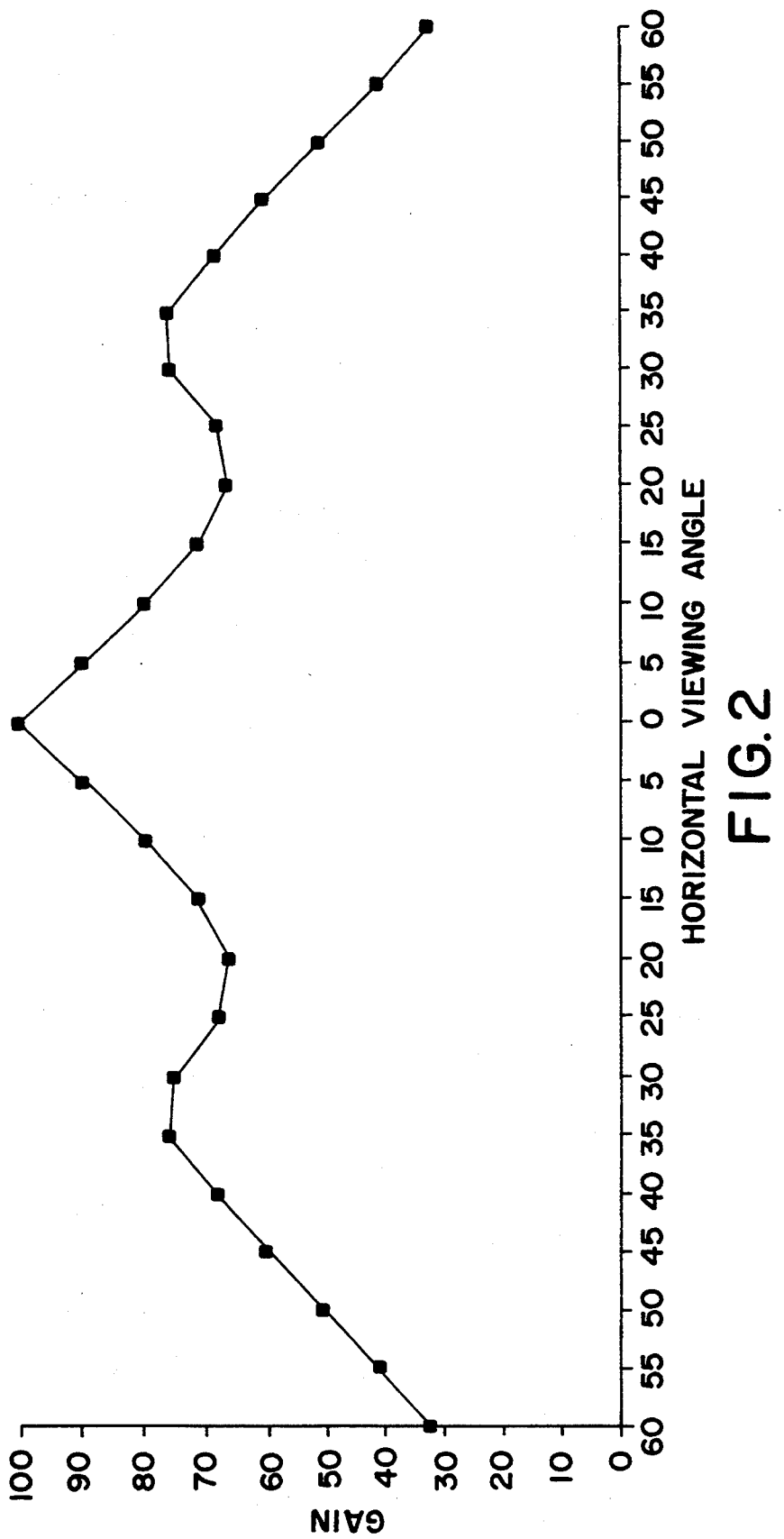
FIG. 2 is a graph of the light intensity or gain versus horizontal viewing angle as measured from the center of the screen.

As discussed above, the particular shape of the each of the lenticular lens 4 increases the intensity of the light exiting the end portion of the lenticular lens 4. The shape, and particularly the curvature of the end portion of the lenticular lens 4, further increases the horizontal viewing half angle to a horizontal viewing half angle which is greater than that of the prior art or greater than 35°. In addition, with the chemical etching and the addition of the colorant and/or diffusing particles to the material from which the lenticular lens system is made, the distribution of the light coming through the rear projection screen is more even than the prior art, has no hot spots, and has a very wide horizontal viewing half angle on the order of 50°, as is shown in the FIG. 2.

Figure 3:
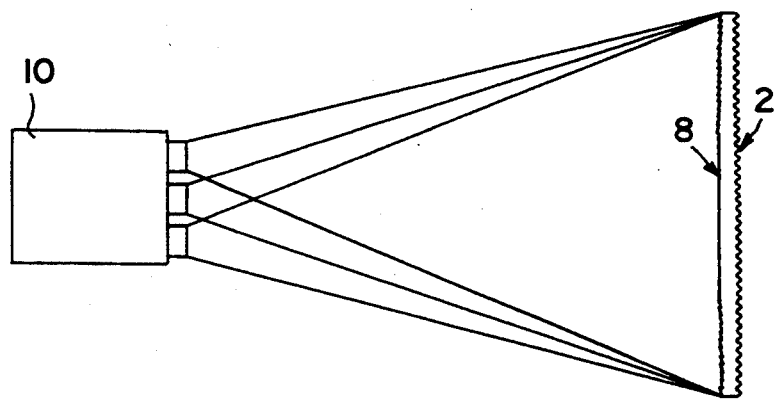
FIG. 3 is an illustration showing the rear projection screen in use.

Referring to FIG. 3, shown therein is the lenticular lens system 2 being utilized as a rear projection screen. In this use, a fresnel lens 8 is provided behind the lenticular lens system 2 to provide collimated light into the lenticular lens system 2. The rear projector comprises three cathode ray tubes which combine with three projection lenses as sources of the video image. Each one of the cathode ray tubes projects a single color, namely read, green and blue. The combination of these form the color image on the rear projection screen. The projector 10 is typically provided in the center of the rear projection screen in both the horizontal and vertical directions and the cathode ray tubes are positioned in a horizontal plane so that the green cathode ray tube projects light perpendicular to the screen and the red and blue cathode ray tubes projects light at small angles. These small angles distort the theoretical lens light refraction and reflection distribution of typical prior art systems and tends to accentuate the red or the blue based on left or right viewing of the image from the front of the screen. For example, a white image which theoretically includes equal amounts of red, green and blue will appear slightly blue in the prior art system when the screen is viewed off axis toward the blue cathode ray tube and will appear slightly red when viewed off axis toward the red cathode ray tube.

However, in the rear projection screen of the present invention, by using internal reflection of the incoming light, the lenticular lens color corrects the image from the three cathode ray tubes. In particular, an image entering the left portion of the lenticular lens 4 on the section P-P' with a red-green-blue orientation reflects from the surface and leaves the right portion of the top of the lenticular lens 4 from the section S-S' as a blue-green-red image. Also, the image entering the right portion of the lenticular lens 4 on the section R-R' with a red-green-blue orientation reflects from that surface and leaves the top portion of the lenticular lens 4 through the section T-T' with a blue-green-red orientation. Light exiting the end portion of the lenticular lens 4 on section V-V' with a red-green-blue orientation will refract from the end portion of the lenticular lens 4 maintaining the red-green-blue orientation. The combination of the image in the viewing field is thereby color corrected so that no discernible red or blue tint to the image on or off axis is seen. As a result, not only does the design of Applicant's invention provide a rear projection screen which is easy and inexpensive to manufacture and also provides an even distribution of the light over a wide angle, but also color corrects the image.

It should be apparent to those skilled in the art that the above-described embodiment is illustrative of but one of the embodiments of the present invention and that numerous and other embodiments could be created without departing from the spirit and scope of the invention.

I claim:

1. A wide angle lenticular lens system for single piece rear projection screens comprising a plurality of identical vertical lenticular lens and wherein:

each of said plurality of said lenticular lens is parallel;

each of said plurality of said lenticular lens is composed of a single element lens; and a shape of each of said plurality of lenticular lens is defined by a hyperbolic function:

$$(X^n/A^n)-(Y^n/B^n)=1$$

wherein a ratio of B to A is chosen to optimize an asymptote angle of a side of each of said plurality of lenticular lens with respect to incoming light into the lenticular lens so that most of the light impinging on a side of each of said lenticular lens is internally reflected out through an end portion of said lenticular lens and n is chosen to optimize a curvature of said end portion of each of said lenticular lens based upon an index or refraction of a material from which the lenticular lens is made so that light internally reflected from said sides of said lenticular lens impinges on said curvature of said end portion at an angle less than a critical angle; whereby substantially all the light entering each of said plurality of lenticular lens exits through said end portion and a wide horizontal viewing half angle is provided.

2. A lenticular lens system according to claim 1 wherein the lenticular lens is made from an acrylate material.

3. A lenticular lens system according to claim 2 wherein said acrylate material is polymerized methylmethacrylate having an index of refraction of 1.491.

4. A lenticular lens system according to claim 3 wherein the ratio of B to A is approximately equal to 2.5 and the critical angle is 42°.

5. A lenticular lens system according to claim 1 wherein each of said plurality of lenticular lens is a single element lens.

6. A lenticular lens system according to claims 1 or 5 wherein a surface of said lenticular lens is chemically etched.

7. A lenticular lens system according to claim 2 wherein a colorant is added to the material from which said lenticular lens system is made.

8. A lenticular lens according to claim 2 or 7 wherein diffusing particles are added to the material from which said lenticular lens is made.

9. A lenticular lens according to claim 1 wherein said lenticular lens is made from a transparent plastic suitable for optical use.

10. A lenticular lens according to claim 1 further comprising a fresnel lens.

* * * * *